United States Patent [19]
Onan

[11] Patent Number: 5,738,463
[45] Date of Patent: *Apr. 14, 1998

[54] ELASTOMERIC GROUTING OF SUBSURFACE CONDUITS

[75] Inventor: David D. Onan, Lawton, Okla.

[73] Assignee: Halliburton Company, Duncan, Okla.

[*] Notice: The term of this patent shall not extend beyond the expiration date of Pat. No. 5,159,980.

[21] Appl. No.: 698,376

[22] Filed: Aug. 15, 1996

[51] Int. Cl.$^6$ ............................................. F16L 57/00
[52] U.S. Cl. ....................... 405/154; 405/157; 138/110
[58] Field of Search ........................... 405/154, 157; 138/110

[56] References Cited

U.S. PATENT DOCUMENTS

| | | | |
|---|---|---|---|
| 3,380,258 | 4/1968 | Young | 405/157 X |
| 3,563,825 | 2/1971 | Segura et al. | 405/157 X |
| 3,774,403 | 11/1973 | Cushing | 405/157 X |
| 4,063,429 | 12/1977 | Wilson | 405/157 |
| 4,663,363 | 5/1987 | Blount | 521/154 |
| 4,695,595 | 9/1987 | Blount | 521/99 |
| 4,737,575 | 4/1988 | Blount | 528/405 |
| 4,769,396 | 9/1988 | Blount | 521/114 |
| 4,795,765 | 1/1989 | Blount | 521/154 |
| 5,159,980 | 11/1992 | Onan et al. | 166/294 |
| 5,293,938 | 3/1994 | Onan et al. | 166/293 |
| 5,346,011 | 9/1994 | Onan et al. | 166/291 |
| 5,483,986 | 1/1996 | Onan et al. | 137/1 |

*Primary Examiner*—Tamara L. Graysay
*Assistant Examiner*—Tara L. Mayo
*Attorney, Agent, or Firm*—Craig W. Roddy; C. Clark Dougherty, Jr.

[57] ABSTRACT

The present invention provides methods of grouting a subsurface conduit whereby the hardened grout resists stress failures. The methods basically comprise the steps of forming a hardenable grout composition having elastomeric properties upon hardening, placing the hardenable grout composition adjacent to the outside of a subsurface conduit whereby upon hardening the grout composition forms an elastomeric solid support for the conduit and allowing the hardenable grout composition to harden into an elastomeric solid mass.

23 Claims, 1 Drawing Sheet

ELASTOMERIC GROUTING OF SUBSURFACE CONDUITS

BACKGROUND OF THE INVENTION

1. Field of the Invention

The present invention provides improved methods of grouting a subsurface conduit whereby the hardened grout resists stress failures due to subsurface ground faults and the like.

2. Description of the Prior Art

A variety of conduits are laid below ground and water surfaces for conducting fluids, electricity, and signals such as electromagnetic waves, light waves and the like. A number of the conduits such as pipelines and sewer lines conduct liquids and gases over relatively long distances.

A problem which is very often encountered with subsurface conduits is the failure of the conduits due to shear and compressional stresses exerted thereon. The stresses are a result of the movement of earth formations along subsurface ground faults, relatively high fluid pressures and/or temperatures inside the conduits resulting in the expansion of the conduits both radially and longitudinally and other similar shear and compressional stresses. The stresses in a subsurface conduit such as a pipeline are defined as the force supplied over an area resulting from a strain caused by the incremental change of the length or volume of the pipeline. Stresses are generally related to strain by a proportionality constant known as Young's Modulus.

Heretofore, subsurface conduits have been positioned within continuous larger diameter outer pipes, sleeves or liners, and the spaces between the outsides of the conduits and the insides of the outer pipes, sleeves or liners have been filled with hydraulic cement compositions. Hydraulic cement compositions are brittle and readily crack or otherwise fail when subjected to significant stress conditions. As mentioned, one such stress condition is the result of relatively high fluid pressures and/or temperatures inside a conduit, e.g., a pipeline, which results in the expansion of the conduit both radially and longitudinally. The expansion of the conduit places stresses on the cement surrounding it causing the cement to crack or otherwise fail which in turn causes the conduit to fail.

Another stress condition results from exceedingly high pressures which occur inside the annular cement sheath itself due to thermal expansion of fluids trapped within the cement sheath. This condition often occurs as a result of high temperature differentials created during the production and/ or transport of a hot fluid combined with channels or pockets of water within the annulus containing the set hydraulic cement. Typically, the pressure of the trapped water exceeds the collapsing pressure of the conduit.

Still another stress condition occurs as a result of subsurface ground faults which shift and cause external stresses to be exerted on the outer pipe, sleeve or liner and the cement sheath causing failure of the cement sheath and ultimately, the internal conduit. In subsurface conduits such as sewer lines which are not subjected to high pressure and temperature differentials, the failures of the hydraulic cement sheaths surrounding the sewer lines and the sewer lines primarily result from shifting ground layers along fault lines.

Thus, there is a need for improved methods of grouting subsurface conduits whereby the hardened grout resists stress failures of the types described above. That is, there is a need for methods of grouting subsurface conduits whereby the hardened grout has improved mechanical properties including high degrees of elasticity and ductility whereby failures due to stresses created in the conduits, the hardened grout surrounding the conduits or the external pipes, sleeves or liners, if used, are reduced or prevented.

SUMMARY OF THE INVENTION

Figure 1:
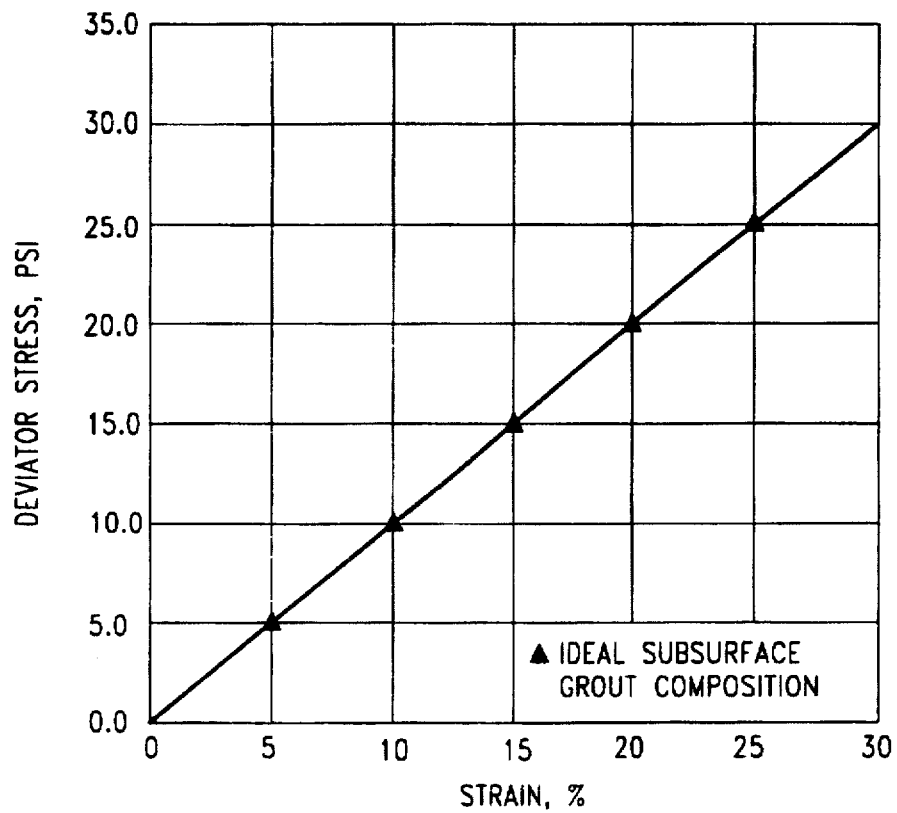
FIG. 1 is a graph showing the stress-strain relationship for an ideal subsurface conduit elastomeric grout composition.

The present invention provides elastomeric grout compositions having improved mechanical properties including high degrees of elasticity and ductility and methods of grouting subsurface conduits using such compositions which meet the needs described above and overcome the deficiencies of the prior art.

The methods of the present invention for grouting a subsurface conduit whereby the hardened grout resists stress failures basically comprise the steps of forming a hardenable grout composition having elastomeric properties upon hardening, placing the hardenable grout composition adjacent to the outside of a subsurface conduit whereby upon hardening the grout composition forms an elastomeric solid support for the conduit, and then allowing the hardenable grout composition to harden into an elastomeric solid mass.

The hardenable grout compositions of this invention which have the necessary elastomeric properties to resist stress failures when supporting subsurface conduits are basically comprised of an aqueous rubber latex, a vulcanizing agent and a vulcanizing activator. The grout composition has a low initial viscosity whereby it can be pumped or otherwise placed in a subsurface location prior to hardening. When hardened, the grout composition provides sufficient structural support for a subsurface conduit while under sustained loads and high strain without the occurrence of stress failure.

A preferred elastomeric grout composition for use in accordance with this invention is comprised of an aqueous styrene/butadiene rubber latex, a sulfur vulcanizing agent, a zinc oxide vulcanizing activator, a sodium lauryl sulfate latex stabilizing surfactant, a dithiocarbamate compound vulcanization accelerator, a calcined clay extender and a polydimethylsiloxane defoaming agent.

It is, therefore, a general object of the present invention to provide elastomeric grout compositions and methods of grouting subsurface conduits using the compositions whereby the hardened grout resists stress failures.

Other and further objects, features and advantages of the present invention will be readily apparent to those skilled in the art upon a reading of the description of preferred embodiments which follows.

DESCRIPTION OF PREFERRED EMBODIMENTS

The present invention provides highly elastomeric grout compositions and methods of utilizing the compositions for grouting subsurface conduits.

Subsurface conduits for conducting fluids, electricity and signals such as electromagnetic waves, light waves, etc. are subjected to frequent stress conditions such as ground fault shear stresses, stresses brought about by internal conduit pressure and temperature conditions and the like. In accordance with the present invention, an elastomeric grout composition having high degrees of elasticity and ductility is utilized to support such subsurface conduits thereby reducing or preventing stress failures.

The elastomeric grout compositions of this invention are basically comprised of a vulcanizable aqueous rubber latex, a vulcanizing agent for the rubber and a vulcanizing activator. A variety of well known rubber materials which are commercially available in aqueous latex form, i.e., aqueous dispersions or emulsions, can be utilized in accordance with the present invention. For example, natural rubber (cis-1,4-polyisoprene) and most of its modified types can be utilized. Synthetic polymers of various types can also be used including styrene/butadiene rubber (SBR), cis-1,4-polybutadiene rubber and blends thereof with natural rubber or styrene/butadiene rubber, high styrene resin, butyl rubber, ethylene-propylene rubbers (EPM and EPDM), neoprene rubber, nitrile rubber, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber and polysulfide rubber. The aqueous latex forms of one or more of the above rubbers can be utilized, and the other components of the grout compositions of this invention can be added directly to the latexes.

Of the various aqueous rubber latexes which can be utilized, those formed of natural rubber, cis-polyisoprene rubber, nitrile rubber, ethylene-propylene rubber, styrene-butadiene rubber, butyl rubber and neoprene rubber are generally preferred.

The most preferred aqueous rubber latex for use in accordance with this invention is a styrene/butadiene copolymer latex emulsion prepared by emulsion polymerization. The aqueous phase of the emulsion is an aqueous colloidal dispersion of the styrene/butadiene copolymer. The latex dispersion usually includes water in an amount in the range of from about 40% to about 70% by weight of the latex, and in addition to the dispersed styrene/butadiene particles, the latex often includes small quantities of an emulsifier, polymerization catalysts, chain modifying agents and the like. The weight ratio of styrene to butadiene in the latex can range from about 10%:90% to about 90%:10%.

Styrene/butadiene latexes are often commercially produced as terpolymer latexes which include up to about 3% by weight of a third monomer to assist in stabilizing the latex emulsions. The third monomer, when present, generally is anionic in character and includes a carboxylate, sulfate or sulfonate group. Other groups that may be present on the third monomer include phosphates, phosphonates or phenolics. Non-ionic groups which exhibit stearic effects and which contain long ethoxylate or hydrocarbon tails can also be present.

A particularly suitable and preferred styrene/butadiene aqueous latex contains water in an amount of about 50% by weight of the latex, and the weight ratio of styrene to butadiene in the latex is about 25%:75%. A latex of this type is available from Halliburton Energy Services of Duncan, Okla., under the trade designation "LATEX 2000™."

Vulcanization of the rubber in the aqueous rubber latex is the process that converts the rubber latex to an elastomeric solid state. The vulcanization process involves the crosslinking of the rubber polymer or copolymer chain and can be accomplished by incorporating a vulcanizing agent in the rubber latex composition. The most common vulcanizing agent which can be utilized with most if not all of the rubber materials described above is sulfur. Other compounds that can be used, either with or without sulfur, are organic peroxide compounds, azo compounds, phenolic curatives, benzoquinone derivatives, bismaleimides, selenium, tellurium, nitro compounds, resins, metal oxides, and organic sulfur compounds such as alkylthiuram disulfides. The rate of vulcanization increases exponentially with increases in temperature, and the time required for the vulcanization of a particular rubber latex can be varied over a wide range by the selection of a particular vulcanizing agent. The preferred vulcanizing agent for use in accordance with the present invention is sulfur.

The vulcanizing agent used is generally included in the grout composition of this invention in an amount in the range of from about 1.5% to about 4% by weight of the aqueous rubber latex therein, more preferably from about 1.5% to about 3% and most preferably about 2%.

In order to initiate the vulcanization reaction, a vulcanization activator is included in the grout composition. Particularly suitable vulcanization activators are fatty acids such as stearic acid, metallic oxides such as zinc oxide and mixtures of such compounds. Zinc oxide is preferred for use as the primary vulcanization activator in accordance with this invention.

The vulcanization activator used is generally included in the grout composition in an amount in the range of from about 2% to about 12% by weight of the aqueous rubber latex in the composition, more preferably from about 2% to about 5% and most preferably about 2.5%.

Another vulcanization activator which is preferably utilized as a secondary activator with the above described primary vulcanization activator is dead-burned (calcined at a higher temperature and for a longer time than usual) magnesium oxide. When used, the dead-burned magnesium oxide is included in the grout composition in an amount in the range of from about 1% to about 10% by weight of the aqueous rubber latex in the composition, more preferably from about 2% to about 5%, and most preferably about 2.5%.

In order to prevent the aqueous latex from prematurely coagulating and increasing the viscosity of the grout composition, an effective amount of a latex stabilizer can be included in the composition. Latex stabilizers are comprised of one or more surfactants which function to prevent coagulation. A suitable such surfactant has the formula

wherein R is an alkyl group having from about 5 to about 30 carbon atoms, Ph is phenyl and m is an integer in the range of from about 5 to about 50. A preferred surfactant in this group is ethoxylated nonylphenol containing in the range of from about 20 to about 30 moles of ethylene oxide.

Another latex stabilizing surfactant which can be used has the general formula

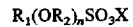

wherein $R_1$ is selected from the group consisting of alkyl groups having from 1 to about 30 carbon atoms, cycloalkyl groups having 5 or 6 carbon atoms, $C_1$–$C_4$ alkyl substituted cycloalkyl groups, phenyl, alkyl substituted phenol of the general formula $(R_3)aPh$- wherein Ph is phenyl, $R_3$ is an alkyl group having from 1 to about 18 carbon atoms and a is an integer of from 1 to 3, and phenyl-alkyl groups wherein the alkyl groups have from 1 to about 18 carbon atoms and the phenyl-alkyl groups have a total of from about 8 to about 28 carbon atoms; $R_2$ is a substituted ethylene group of the formula $-CH_2CH_2R_4$ wherein $R_4$ is selected from hydrogen, methyl, ethyl or mixtures thereof; n is a number from 0 to about 40 provided that when $R_1$ is phenyl or alkyl substituted phenyl, n is at least 1; and X is any compatible cation.

Another surfactant which can be utilized is a sodium salt having the general formula $$R_5-Ph(OR_6)_oSO_3X$$

wherein $R_5$ is an alkyl group having in the range of from 1 to about 9 carbon atoms, $R_6$ is the group $-CH_2CH_2-$, o is an integer from about 10 to about 20 and X is a compatible cation.

Another surfactant which can be utilized is a sodium salt having the formula $$R_7(OR_8)_pSO_3X$$

wherein $R_7$ is an alkyl group having in the range of from about 5 to about 20 carbon atoms, $R_8$ is the group $-CH_2CH_2-$, p is an integer in the range of from about 10 to about 40 and X is a compatible cation. A preferred surfactant of this type is the sodium salt of a sulfonated compound derived by reacting a $C_{12}-C_{15}$ alcohol with about 15 moles of ethylene oxide which is commercially available under the name "AVANEL S150™" from PPG Mazer, a division of PPG Industries, Inc. of Gurnee, Ill.

Another latex stabilizing surfactant which can be utilized and which is preferred for use in accordance with the present invention has the formula $$H(CH_2)_qSO_3Na$$

wherein q is an integer in the range of from about 12 to about 15. A particularly preferred surfactant of this type is sodium lauryl sulfate which is commercially available under the tradename "DARVAN WAQ™" from the R. T. Vanderbilt Company, Inc., of Norwalk, Conn.

While different latex stabilizers and amounts are included in the grout compositions depending on the particular aqueous rubber latex used and other factors, the latex stabilizer is usually included in a grout composition of this invention in an amount in the range of from about 2% to about 6% by weight of the aqueous rubber latex included therein. When the aqueous latex is an aqueous styrene/butadiene latex, the latex stabilizer utilized is preferably a 33% by volume aqueous solution of sodium lauryl sulfate present in the grout composition in an amount in the range of from about 3% to about 5% by weight of the aqueous rubber latex, more preferably from about 3% to about 4% and most preferably about 3.75%.

In order to shorten the vulcanization time beyond that obtainable by the selection of a particular vulcanizing agent alone, a vulcanization accelerator can be included in the grout composition. Such accelerators generally function to initiate free radicals and they are preferably selected from the group consisting of aldehyde amine compounds, guanidine compounds, sulfenamide compounds, thiuram sulfide compounds, thiazole compounds, thiazoline compounds, dithiocarbamate compounds and mercaptoimidazoline compounds. Of these, a dithiocarbamate compound having the formula $(CH_3)_2NCS_2^-[NH_2(CH_3)_2]^+$ is preferred.

When used, the vulcanization accelerator is included in the grout composition of this invention in an amount in the range of from about 0.25% to about 2.5% by weight of aqueous rubber latex in the composition, more preferably from about 0.3% to about 1% and most preferably about 0.5%.

To improve the properties of the grout composition of this invention, a filler or extender can be included in the composition. Examples of suitable extenders are carbon black, high styrene resins, inorganic fillers such as zinc oxide and silica and other inert fillers such as whiting, clays, synthetic fibers, ground rubber, expanded perlites and microspheres. Of these, an extender comprised of calcined metakaolin ball clay is preferred.

The extender utilized is generally included in the grout composition in an amount in the range of from about 15% to about 150% by weight of aqueous rubber latex in the composition, more preferably from about 18% to about 50%, and most preferably about 40%.

In order to prevent the vulcanized rubber in the grout composition from degradation due to the effects of exposure to atmospheric air entrained in the grout composition during mixing, a defoaming agent can be included in the composition. The defoaming agent can be any of the compounds well known for such capabilities such as the polyol silicon compounds. A preferred such defoaming agent is polydimethylsiloxane which is commercially available from Halliburton Energy Services of Duncan, Okla., under the trade designation "D-AIR™." When used, the defoaming agent is generally included in the grout composition in an amount in the range of from about 0.5% to about 4% by weight of the aqueous rubber latex in the composition, more preferably from about 2% to about 4%, and most preferably about 3.75%.

A particularly preferred grout composition which when hardened (vulcanized) resists stress failures is comprised of an aqueous styrene/butadiene rubber latex containing water in an amount of about 50% by weight of the latex and having a weight ratio of styrene to butadiene of about 25%:75%; a vulcanizing agent comprised of sulfur present in an amount in the range of from about 1.5% to about 3% by weight of the aqueous rubber latex; a primary vulcanization activator comprised of zinc oxide present in the composition in an amount in the range of from about 2% to about 5% by weight of the aqueous rubber latex; a secondary vulcanization activator comprised of dead-burned magnesium oxide present in the composition in an amount in the range of from about 2% to about 5% by weight of the aqueous rubber latex; a latex stabilizing surfactant comprising a 33% by volume aqueous solution of sodium lauryl sulfate present in an amount in the range of from about 3% to about 4% by weight of the aqueous rubber latex; a vulcanization accelerator comprising a dithiocarbamate compound having the formula $(CH_3)_2NCS_2^-[NH_2(CH_3)_2]^+$ present in an amount in the range of from about 0.3% to about 1% by weight of the aqueous rubber latex; an extender comprising calcined metakaoline ball clay present in an amount in the range of from about 18% to about 50% by weight of the aqueous rubber latex; and a polydimethylsiloxane defoaming agent present in an amount in the range of from about 2% to about 4% by weight of the aqueous rubber latex.

The grout compositions of this invention can be prepared in accordance with any of the well known mixing techniques so long as the latex and latex stabilizing surfactant are not directly admixed without prior dilution by other liquids present. In one preferred method, a quantity of water is introduced into a blender and the defoamer, the latex and the latex stabilizer are then sequentially added with suitable agitation to disperse the constituents. The other liquid additives may then be admixed with the slurry followed by other dry solid additives. The mixture is agitated for a sufficient period of time to admix the components and form a pumpable slurry.

While the water in the aqueous rubber latex is generally adequate for producing a pumpable slurry, additional water can be added to the grout composition as required for pumpability and mixing. The water can be from any source provided it does not contain an excess of compounds that adversely affect other components in the grout composition.

The methods of this invention for grouting a subsurface conduit whereby the grout resists stress failures basically comprise the steps of forming a hardenable grout composition of this invention, placing the grout composition adjacent to or around the outside of a conduit whereby upon hardening the grout composition forms an elastomeric solid support for the conduit and then allowing the hardenable grout composition to harden into an elastomeric solid mass. The subsurface conduit which is grouted in accordance with this invention can be a fluid conducting pipeline, a sewer line, a signal conducting cable or the like. The conduit can be positioned within a continuous larger diameter outer pipe, sleeve or liner, and if so, the hardenable grout composition is placed in the space between the outside of the conduit and the inside of the outer pipe, sleeve or liner.

In order to further illustrate the methods and grout compositions of the present invention, the following example is given.

EXAMPLE

As mentioned above, in order for a grout composition of this invention to resist stress failures of the type described herein when supporting a subsurface conduit, the grout composition must be highly elastomeric, i.e., exhibit high degrees of elasticity and ductility. Further, the grout composition must have an initial viscosity low enough to be pumpable whereby it can be placed adjacent to and/or around a subsurface conduit prior to hardening.

The following properties were determined to be required for an elastomeric grout composition to be placed in a subsurface location, to support a conduit in that location and to resist the various stresses placed on the composition after hardening.

1. After preparation, the grout composition must be pumpable through a 2" diameter hose for a distance of 500 ft. with a maximum allowable pressure at the point of placement of 15 psi.
2. The compressive strength of the hardened grout composition after 7 days must be 10 psi at 10% strain.
3. The creep rate of the hardened grout composition must be 0 at 3 psi.
4. The viscosity of the grout composition after mixing must be in the range of from 1 to 2 centipoises.
5. Samples of the hardened grout composition when tested in accordance with the procedure set forth in the American Society for Testing Materials STANDARD TEST METHOD FOR UNCONSOLIDATED, UNDRAINED COMPRESSIVE STRENGTH OF COHESIVE SOILS IN TRIAXLE COMPRESSION [ASTM D 2850(Modified)] must have a stress-strain relationship substantially the same as the stress-strain relationship shown in FIG. 1 which has been determined to be ideal for subsurface conduit grouting applications.

Two grout compositions of the present invention were prepared comprised of the components and amounts given in Table I below.

TABLE I

Test Grout Compositions

| Component | Amount, % By Weight Of Aqueous Rubber Latex | |
|---|---|---|
| | Composition No. 1 | Composition No. 2 |
| Aqueous Rubber Latex[1] | — | — |
| Vulcanizing Agent[2] | 2.00 | 2.00 |
| Primary Vulcanization Activator[3] | 2.50 | 2.50 |
| Secondary Vulcanization Activator[4] | 2.50 | 2.50 |
| Latex Stabilizing Surfactant[5] | 3.75 | 3.75 |
| Vulcanization Accelerator[6] | 0.50 | 0.50 |
| Extender[7] | 37.50 | 18.75 |
| Defoaming Agent[8] | 3.75 | 3.75 |

Figure 2:
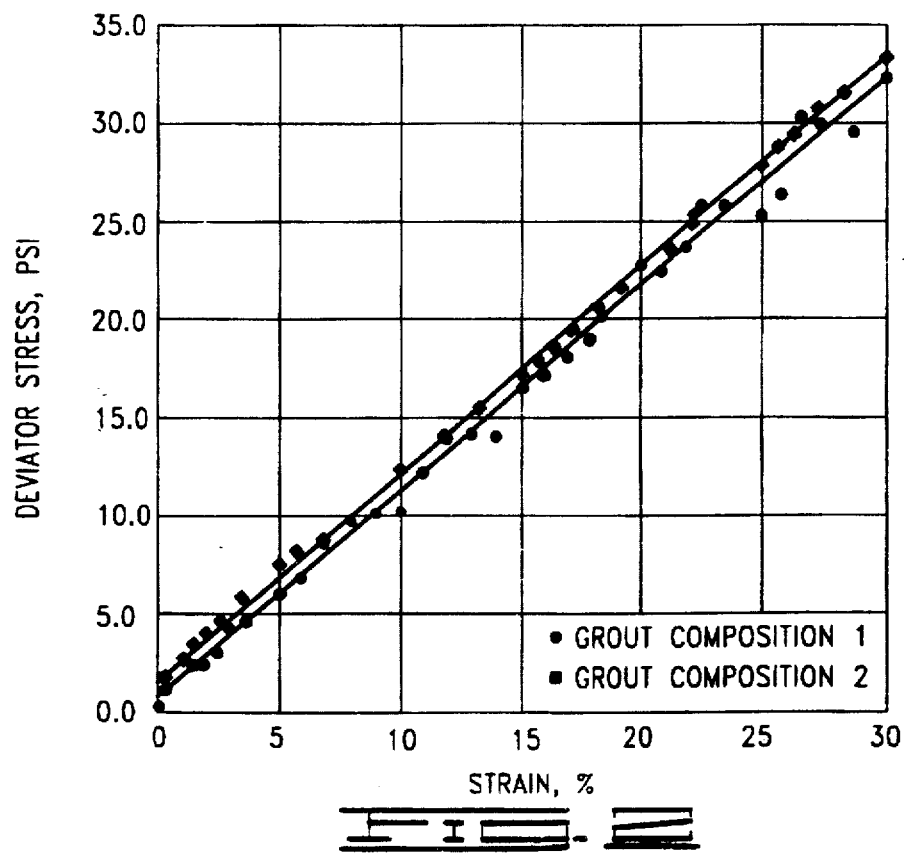
FIG. 2 is a stress-strain graph showing the results of tests performed on grout compositions of the present invention in accordance with ASTM D 2850 (modified).

[1]Aqueous styrene/butadiene (25%:75% by wt.) latex containing 50% by wt. water ("LATEX 2000 ™").
[2]Sulfur
[3]Zinc oxide
[4]Dead-burned magnesium oxide
[5]Sodium lauryl sulfate (33% active)
[6]A dithiocarbamate compound having the formula $(CH_3)_2NCS^-{}_2[NH_2(CH_3)_2]^+$.
[7]Metakaolin ball clay
[8]Polydimethylsiloxane defoaming agent Samples of each of grout compositions Nos. 1 and 2 described in Table I were tested for the properties set forth above and in accordance with the ASTM D 2850 (Modified) test method. Both of grout compositions Nos. 1 and 2 met the pumping, compressive strength, creep rate and viscosity perimeters set forth in paragraphs 1–4 above. In addition, when tested in accordance with the ASTM D 2850 test procedure, grout compositions Nos. 1 and 2 produced the stress-strain curves shown in FIG. 2. A comparison of FIGS. 1 and 2 shows that the grout compositions of this invention have stress-strain relationships which are substantially the same as the ideal subsurface grout composition stress-strain relationship.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of grouting a subsurface conduit whereby the hardened grout resists stress failures comprising the steps of:
   forming a hardenable grout composition having elastomeric properties upon hardening comprised of an aqueous rubber latex, a vulcanizing agent for said rubber and a vulcanization activator;
   placing said hardenable grout composition around the outside of said conduit whereby upon hardening said grout composition forms an elastomeric solid support for said conduit; and
   allowing said hardenable grout composition to harden into an elastomeric solid mass.

2. The method of claim 1 wherein said aqueous rubber latex is selected from the group consisting of natural rubber, cis-polyisoprene rubber, nitrile rubber, ethylene-propylene rubber, styrene-butadiene rubber, butyl rubber and neoprene rubber.

3. The method of claim 1 wherein said aqueous rubber latex is an aqueous styrene/butadiene latex.

4. The method of claim 3 wherein said aqueous styrene/butadiene latex contains water in an amount of about 50% by weight of said latex, and the weight ratio of styrene to butadiene in said latex is about 25%:75%.

5. The method of claim 1 wherein said vulcanizing agent is selected from the group consisting of sulfur, organic peroxide compounds, azo compounds, phenolic curatives, benzoquinone derivatives, bismaleimides, selenium, tellurium, nitro compounds, resins, metal oxides, organic sulfur compounds and mixtures of such compounds.

6. The method of claim 5 wherein said vulcanizing agent is sulfur.

7. The method of claim 1 wherein said vulcanization activator is selected from the group consisting of fatty acids, metallic oxide compounds and mixtures of such compounds.

8. The method of claim 7 wherein said vulcanization activator is zinc oxide.

9. The method of claim 1 wherein said grout composition further comprises a secondary vulcanization activator comprising dead burned magnesium oxide.

10. The method of claim 1 wherein said grout composition further comprises a latex stabilizing surfactant.

11. The method of claim 10 wherein said surfactant is comprised of sodium lauryl sulfate.

12. The method of claim 1 wherein said grout composition further comprises a vulcanization accelerator selected from the group consisting of aldehyde amine compounds, guanidine compounds, sulfenamide compounds, thiuram sulfide compounds, thiazole compounds, thiazoline compounds, dithiocarbamate compounds and mercaptoimidazoline compounds.

13. The method of claim 12 wherein said vulcanization accelerator is a dithiocarbamate compound having the formula $(CH_3)_2NCS_2^-[NH_2(CH_3)_2]^+$.

14. The method of claim 1 wherein said grout composition further comprises an extender selected from the group consisting of carbon black, styrene resins, zinc oxide, silica, whiting, clays, synthetic fibers, ground rubber, expanded perlites and microspheres.

15. The method of claim 14 wherein said extender is calcined metakaolin ball clay.

16. The method of claim 1 wherein said grout composition further comprises a defoaming agent.

17. The method of claim 16 wherein said defoaming agent is polydimethylsiloxane.

18. A method of grouting a subsurface conduit whereby the hardened grout resists stress failures comprising the steps of:

forming a hardenable grout composition having elastomeric properties upon hardening comprised of an aqueous styrene/butadiene rubber latex, a vulcanizing agent comprised of sulfur present in an amount in the range of from about 1.5% to about 3% by weight of said aqueous rubber latex, a primary vulcanization activator comprised of zinc oxide present in said composition in an amount in the range of from about 2% to about 5% by weight of said aqueous rubber latex, a secondary vulcanization activator comprising dead burned magnesium oxide present in an amount in the range of from about 2% to about 5% by weight of said rubber latex, a latex stabilizing surfactant comprising sodium lauryl sulfate present in an amount in the range of from about 3% to about 5% by weight of said rubber latex, a vulcanization accelerator comprising a dithiocarbamate compound having the formula $(CH_3)_2NCS_2^-[NH_2(CH_3)_2]^+$ present in an amount in the range of from about 0.3% to about 1% by weight of said rubber latex, an extender comprising calcined metakaolin ball clay present in an amount in the range of from about 18% to about 50% by weight of said rubber latex, and a polydimethylsiloxane defoaming agent present in an amount in the range of from about 2% to about 4% by weight of said rubber latex;

placing said hardenable grout composition adjacent to the outside of said conduit whereby upon hardening said grout composition forms an elastomeric solid support for said conduit; and allowing said hardenable grout composition to harden into an elastomeric solid mass.

19. The method of claim 18 wherein said aqueous styrene/butadiene latex contains water in an amount of about 50% by weight of said latex, and the weight ratio of styrene to butadiene in said latex is about 25%:75%.

20. The method of claim 19 wherein said conduit comprises a fluid conducting pipeline.

21. The method of claim 19 wherein said conduit comprises a sewer line.

22. The method of claim 19 wherein said conduit comprises a signal conducting cable.

23. The method of claim 19 wherein said conduit is positioned within an outer sleeve, and said hardenable grout composition is placed in the space between the outside of said conduit and the inside of said outer sleeve.

* * * * *